United States Patent
Kawazoe et al.

(10) Patent No.: US 9,855,838 B2
(45) Date of Patent: Jan. 2, 2018

(54) INDUSTRIAL VEHICLE

(71) Applicant: Mitsubishi Nichiyu Forklift Co., Ltd., Kyoto (JP)

(72) Inventors: Jun Kawazoe, Kyoto (JP); Syunta Takahashi, Kyoto (JP)

(73) Assignee: Mitsubishi Logisnext Co., LTD., Kyoto (JP)

( * ) Notice: Subject to any disclaimer, the term of this patent is extended or adjusted under 35 U.S.C. 154(b) by 0 days.

(21) Appl. No.: 15/500,946

(22) PCT Filed: Aug. 21, 2014

(86) PCT No.: PCT/JP2014/071869
§ 371 (c)(1),
(2) Date: Feb. 1, 2017

(87) PCT Pub. No.: WO2016/027345
PCT Pub. Date: Feb. 25, 2016

(65) Prior Publication Data
US 2017/0217305 A1   Aug. 3, 2017

(51) Int. Cl.
*B66F 9/07* (2006.01)
*B60K 13/04* (2006.01)
(Continued)

(52) U.S. Cl.
CPC .............. *B60K 13/04* (2013.01); *B60K 11/04* (2013.01); *B66F 9/07* (2013.01); *B66F 9/07513* (2013.01);
(Continued)

(58) Field of Classification Search
CPC ........ B60K 13/04; B60K 13/06; B60K 11/04; B66F 9/07; B66F 9/07554; B66F 9/07513; B66F 9/07595
See application file for complete search history.

(56) References Cited

U.S. PATENT DOCUMENTS

2004/0188994 A1* 9/2004 Uematsu ................ B60G 9/02
280/759
2014/0301816 A1* 10/2014 Kokuryo ................ B60K 11/04
414/687
(Continued)

FOREIGN PATENT DOCUMENTS

JP    S52-137430    10/1977
JP    H08-312335    11/1996
(Continued)

OTHER PUBLICATIONS

International Search Report in corresponding international application No. PCT/JP2014/071869, dated Nov. 11, 2014.

*Primary Examiner* — Erez Gurari
(74) *Attorney, Agent, or Firm* — Kirschstein, Israel, Schiffmiller & Pieroni, P.C.

(57) ABSTRACT

An engine exhaust system is accommodated in a counterweight portion while minimizing a change in an existing arrangement of an engine, a radiator, a radiator fan, and the counterweight portion. A body has a work device provided at the front and the counterweight portion at the rear. A ventilation path provided in the counterweight portion includes an elevated part formed between a bottom of a front portion and a bottom of a rear portion. An exhaust gas purification device and a muffler, both having a tube-like outer shape, are disposed in the rear portion of the ventilation path so as to be positioned one above the other with the purification device lying above the muffler. Pipes, which extend straight respectively from an end circumferential surface of the purification device and an end circumferential surface of the muffler toward each other, are connected via flanges.

9 Claims, 5 Drawing Sheets

(51) Int. Cl.
  *B66F 9/075* (2006.01)
  *B60K 11/04* (2006.01)
  *F01N 13/14* (2010.01)
  *E02F 3/28* (2006.01)
  *E02F 9/08* (2006.01)

(52) U.S. Cl.
  CPC ...... *B66F 9/07554* (2013.01); *B66F 9/07595* (2013.01); *F01N 13/14* (2013.01); *E02F 3/28* (2013.01); *E02F 9/0866* (2013.01); *F01N 2260/20* (2013.01)

(56) References Cited

U.S. PATENT DOCUMENTS

| | | | |
|---|---|---|---|
| 2016/0010308 A1* | 1/2016 | Shimohira | E02F 9/0841 180/309 |
| 2016/0215477 A1* | 7/2016 | Kumagai | B60K 13/04 |
| 2016/0265192 A1* | 9/2016 | Kanou | E02F 9/18 |
| 2016/0273425 A1* | 9/2016 | Hatazaki | F01N 3/05 |
| 2017/0067227 A1* | 3/2017 | Ota | B60K 1/04 |
| 2017/0217305 A1* | 8/2017 | Kawazoe | B60K 13/04 |
| 2017/0226715 A1* | 8/2017 | Ota | E02F 3/32 |

FOREIGN PATENT DOCUMENTS

| | | |
|---|---|---|
| JP | 2009-292363 | 12/2009 |
| JP | 2010-209814 | 9/2010 |
| JP | 2010-216389 | 9/2010 |
| JP | 2011-021496 | 2/2011 |
| JP | 2012-097413 | 5/2012 |
| JP | 2012-106836 | 6/2012 |
| JP | 2013-224542 | 10/2013 |

* cited by examiner

INDUSTRIAL VEHICLE

TECHNICAL FIELD

The present invention relates to industrial vehicles, particularly to an industrial vehicle, such as a forklift or a shovel loader, which includes an engine as a power source and has a work device attached at the front of a body.

BACKGROUND ART

Some of the industrial vehicles such as a forklift and a shovel loader include diesel engines as power sources. Incidentally, emissions control is applied to diesel engine vehicles, and it is obligatory to reduce hazardous substances in exhaust gas, such as particulate matter (PM), sulfur oxide, and nitrogen oxide ($NO_x$), to standard values or lower. Accordingly, industrial vehicles equipped with diesel engines also have exhaust gas purification devices attached on the upstream side relative to exhaust pipe mufflers of the engines.

For example, conventional forklifts equipped with diesel engines have work devices provided at the front of bodies, and also have counterweight portions provided at the rear of the bodies in order to balance loads on the work devices, and the engines are attached to the bodies and positioned forward from the counterweight portions (see, for example, Patent Documents 1 and 2). Moreover, provided in the counterweight portions are ventilation paths extending in the front-rear direction of the bodies.

Furthermore, there are radiators disposed rearward from the engines so as to be positioned immediately before front end openings of the ventilation paths or at the front of the ventilation paths, and also disposed between the engines and the radiators are radiator fans for cooling the radiators. Accordingly, airflows generated by rotation of the radiator fans are exhausted through the ventilation paths to the outside of the bodies.

Further, the forklifts include exhaust pipes, exhaust gas purification devices and mufflers, in which the exhaust pipes are supported by the bodies, connected to the engines at one end, and protrude from the rear of the bodies to the outside at the other end, and the exhaust gas purification devices and the mufflers are provided at some positions along the exhaust pipes. Typically, the exhaust gas purification device and the muffler have a cylindrical outer shape, and constitute a relatively large component unit in the forklift in the case where the forklift is small.

Still further, the operating temperature of the exhaust gas purification device is considerably high (about 400 to 800° C.), and in addition, the exhaust gas purification device is designed to be heated by exhaust gas and therefore is preferably disposed as close as possible to an exhaust manifold of the engine.

Accordingly, there is an issue as to where in the body to dispose an engine exhaust system, which consists of the exhaust pipe, the exhaust gas purification device, and the muffler, and in this case, for reasons concerned with the structure of the forklift, it is desirable to not change the existing arrangement of the engine, the radiator, the radiator fan, and the counterweight portion on the body (i.e., the positional relationship therebetween).

In this regard, Patent Documents 1 and 2 disclose that, considering the downsizing of the body, the ensuring of the driver's view, prevention of burns to the driver, easy maintenance of the exhaust gas purification device, etc., the exhaust gas purification device is disposed so as to face the back of the radiator.

However, Patent Documents 1 and 2 disclose neither the place in which to dispose the muffler, which is another component of the engine exhaust system, nor the mode of connecting the muffler and the exhaust gas purification device. If the exhaust gas purification device and the muffler are disposed serially in a straight line as seen in typical cars, the size of the entire engine exhaust system increases, and therefore, it is almost requisite to change existing arrangements. Moreover, in the case where the exhaust gas purification device and the muffler are disposed in parallel and connected at respective end surfaces by a curved bellows connector in order to reduce the entire size, if the muffler and the exhaust gas purification device oscillate differently, the connecting portions might be subjected to loads to such an extent that the bellows connector breaks.

PRIOR ART DOCUMENTS

Patent Documents

Patent Document 1: Japanese Laid-Open Patent Publication No. H08-312335
Patent Document 2: Japanese Laid-Open Patent Publication No. 2012-106836

DISCLOSURE OF THE INVENTION

Problems to be Solved by the Invention

Therefore, the present invention addresses a problem of allowing an engine exhaust system to be accommodated in a counterweight portion while minimizing a change in an existing arrangement.

Solution to the Problems

To solve the problem, the present invention provides an industrial vehicle including a work device attached at a front of a body, a counterweight portion for balancing a load on the work device, the counterweight portion being disposed at a rear of the body and having a ventilation path provided therein so as to extend in a front-rear direction of the body, an engine attached to the body as a power source and disposed forward from the counterweight portion, a radiator disposed rearward from the engine so as to be positioned immediately before a front end opening of the ventilation path or at a front portion of the ventilation path, a radiator fan for cooling the radiator, the radiator fan being disposed between the engine and the radiator and allowing an airflow generated by rotation of the radiator fan to be exhausted to the outside of the body through the ventilation path, an exhaust pipe supported by the body, connected to the engine at one end, and protruding from the rear of the body to the outside at the other end, and an exhaust gas purification device and a muffler provided at some positions along the exhaust pipe, in which, both the exhaust gas purification device and the muffler have a tube-like outer shape and are disposed rearward from the radiator in the ventilation path, either one above the other or side by side in a right-left direction of the body, and pipes extend straight respectively from end circumferential surfaces of the exhaust gas purification device and the muffler toward each other and are connected via flanges.

In a preferred embodiment of the present invention, between the radiator and the exhaust gas purification device, a windbreak plate for preventing the airflow from blowing onto the exhaust gas purification device is disposed so as to face the exhaust gas purification device. In this case, the windbreak plate has heat insulation properties.

In another preferred embodiment of the present invention, an elevated part is formed between bottoms of the front and rear portions of the ventilation path, whereby the bottom of the rear portion is lower than the bottom of the front portion, the exhaust gas purification device and the muffler are disposed in the rear portion of the ventilation path so as to be positioned one above the other with the exhaust gas purification device lying above the muffler and at least partially protruding above the bottom of the front portion of the ventilation path, and the windbreak plate is erected on the bottom of the front portion such that the windbreak plate has an upper end surface positioned higher than an upper end surface of the exhaust gas purification device.

In still another preferred embodiment of the present invention, the exhaust gas purification device and the muffler are disposed one above the other with the exhaust gas purification device lying below the muffler, and the windbreak plate is erected on the bottom of the ventilation path such that the windbreak plate has an upper end surface positioned higher than an upper end surface of the exhaust gas purification device. In yet another preferred embodiment of the present invention, at least an upper portion of the windbreak plate is bent or curved toward the exhaust gas purification device. In yet another preferred embodiment of the present invention, both the exhaust gas purification device and the muffler extend in the right-left direction of the body.

In yet another preferred embodiment of the present invention, an elevated part is thrilled between bottoms of the front and rear portions of the ventilation path, whereby the bottom of the rear portion is lower than the bottom of the front portion, the exhaust gas purification device and the muffler are disposed in the rear portion of the ventilation path so as to be positioned side by side in the right-left direction of the body, with the exhaust gas purification device at least partially protruding above the bottom of the front portion of the ventilation path, and the windbreak plate is erected on the bottom of the front portion such that the windbreak plate has an upper end surface positioned higher than an upper end surface of the exhaust gas purification device. In yet another preferred embodiment of the present invention, both the exhaust gas purification device and the muffler extend vertically.

It should be noted that an example of the industrial vehicle to which the present invention can be applied is a forklift.

Effect of the Invention

In accordance with the present invention, the pipes that extend straight respectively from the end circumferential surfaces of the exhaust gas purification device and the muffler toward each other are connected via the flanges, and therefore, both the exhaust gas purification device and the muffler can be compactly accommodated in the counterweight portion without any concerns about breakage of connecting portions, which might occur when a bellows connector is used. Moreover, in accordance with the present invention, the ventilation path in the counterweight portion is utilized as the space to accommodate the exhaust gas purification device and the muffler, and therefore, there is almost no need to change existing structures of industrial vehicles. Thus, the present invention can be applied to a number of existing industrial vehicles at extremely low costs.

MODE FOR CARRYING OUT THE INVENTION

Hereinafter, a preferred embodiment of the present invention will be described with reference to the accompanying drawings.

Figure 1:
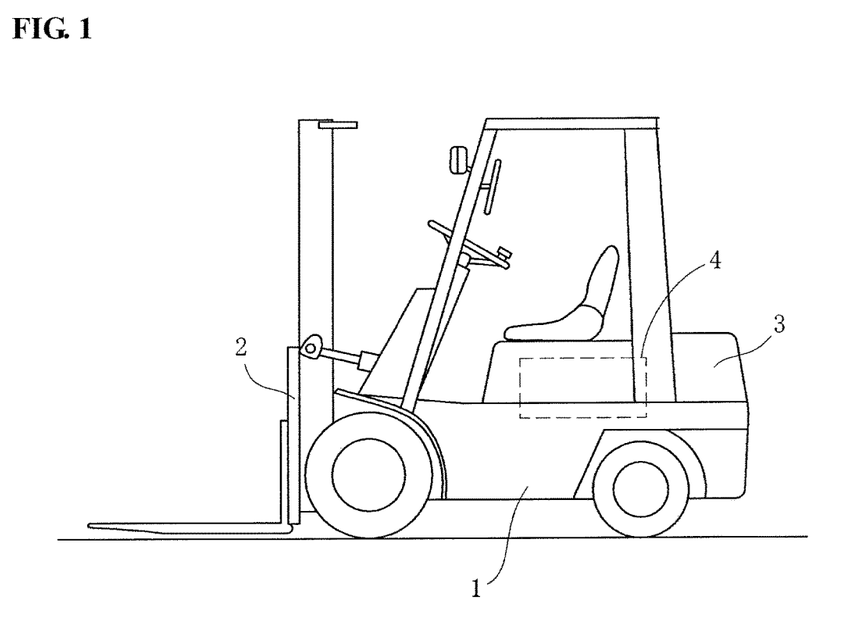
FIG. 1 is a side view illustrating the general configuration of an industrial vehicle in the form of a forklift according to an embodiment of the present invention.

FIG. 1 is a side view schematically illustrating the general configuration of an industrial vehicle according to an embodiment of the present invention. In this embodiment, the industrial vehicle is in the form of a forklift, as shown in FIG. 1. Referring to FIG. 1, the forklift has a fork 2 attached at the front of a body 1 as a work device, and a counterweight portion 3 disposed at the rear of the body 1 in order to balance a load on the fork 2. In addition, provided forward from the counterweight portion 3 on the body 1 is an engine (diesel engine) 4 serving as a power source.

Figure 2:
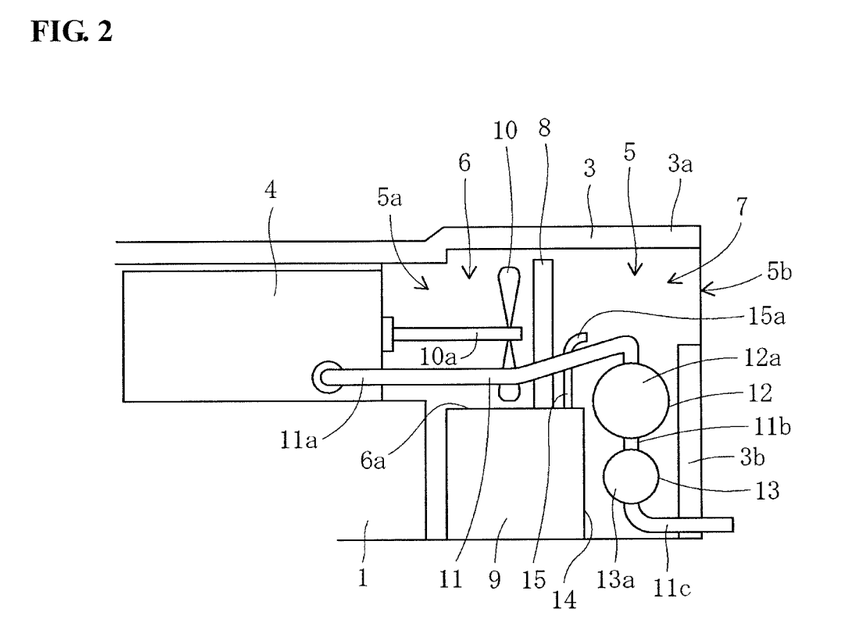
FIG. 2 is a cross-sectional view taken along the direction of the central axis of a body of the forklift shown in FIG. 1, outlining the structure of a counterweight portion.
Figure 3A:
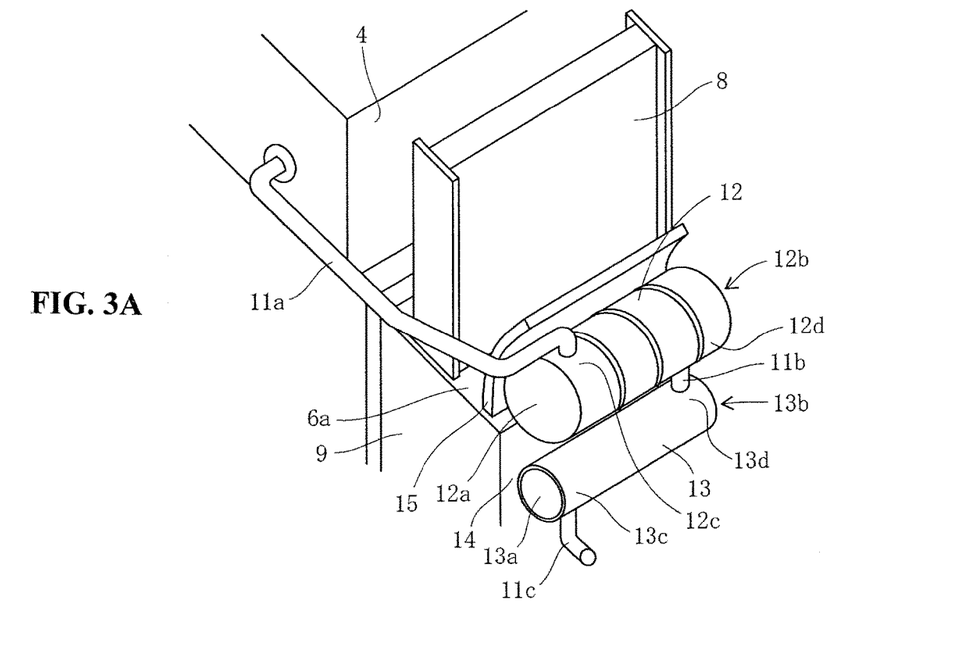
FIG. 3A and FIG. 3B provide views illustrating main internal components of the counterweight portion shown in FIG. 2.
Figure 3B:
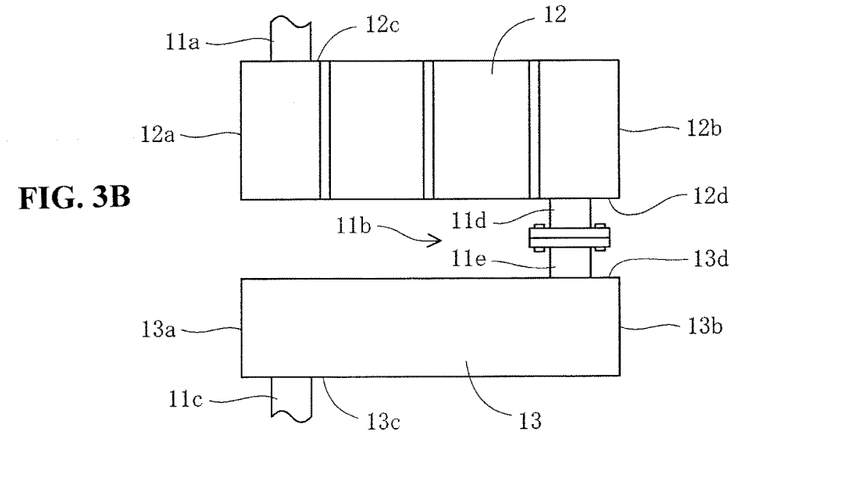

FIG. 2 is a cross-sectional view taken along the direction of the central axis of the body 1 of the forklift, outlining the structure of the counterweight portion 3, and FIG. 3 provides (A) an oblique view and (B) a rear view, both of which illustrate main internal components of the counterweight portion 3 shown in FIG. 2. Referring to FIG. 2, the counterweight portion 3 has an upper wall 3a, a rear wall 3b, and left and right side walls (not shown), and provided in the counterweight portion 3 is a ventilation path 5 extending in the front-rear direction of the body 1 and having a front end opening serving as an air inlet 5a and a rear end opening serving as an air outlet 5b. The air outlet 5b is provided in the rear wall 3b of the counterweight portion 3.

The ventilation path 5 has an elevated part 14 formed between a bottom 6a of a front portion 6 and a bottom of a rear portion 7, so that the bottom of the rear portion 7 is lower than the bottom 6a of the front portion 6. Note that in this embodiment, the bottom 6a of the front portion 6 of the ventilation path 5 is formed by a part of the surface of a counterweight or body 9, and the ventilation path 5 is open at the bottom of the rear portion 7.

Disposed in the front portion 6 of the ventilation path 5 is a radiator 8 tier cooling an engine coolant. The radiator 8 is erected on the bottom 6a of the front portion 6 of the ventilation path 5 so as to face the air inlet 5a and the air outlet 5b. Note that in this embodiment, although the radiator 8 is disposed in the front portion 6 of the ventilation path 5, if necessary, the radiator 8 may be disposed rearward from the engine 4 so as to be positioned immediately before the air inlet 5a of the ventilation path 5.

Disposed between the engine 4 and the radiator 8 is a radiator fan 10 for cooing the radiator 8. The radiator fan 10 is positioned so as to face the front of the radiator 8, and has a rotating shaft 10a coupled to the engine 4. The radiator fan 10 is rotationally driven by the engine 4. An airflow is generated by rotation of the radiator fan 10 and exhausted through the ventilation path 5 to the outside of the body 1 from the air outlet 5b.

The forklift further includes an exhaust pipe 11, an exhaust gas purification device 12, and a muffler 13, in which the exhaust pipe 11 is supported by the body 1, connected to the engine 4 at one end, and protrudes from the rear of the body 1 to the outside at the other end, and the exhaust gas purification device 12 and the muffler 13 are provided at some positions along the exhaust pipe 11. The exhaust gas purification device 12 includes, for example, a diesel particulate filter (DPF), a diesel oxidation catalyst (DOC), and so on.

In this embodiment, both the exhaust gas purification device 12 and the muffler 13 have a cylindrical outer shape. Moreover, the exhaust gas purification device 12 and the muffler 13 discretely extend in the rear portion 7 of the ventilation path 5 in the right-left direction of the body 1, and are positioned one above the other with the exhaust gas purification device 12 lying above the muffler 13 and at least partially (in this embodiment, the upper half) protruding above the bottom 6a of the front portion 6 of the ventilation path 5.

Although not shown, the exhaust gas purification device 12 and the muffler 13 are fixed to the body 1 at predetermined discrete positions, either directly by bolts and nuts or via appropriate supporting members.

Disposed between the radiator 8 and the exhaust gas purification device 12 is a windbreak plate 15 for preventing an airflow generated by rotation of the radiator fan 10 from blowing onto the exhaust gas purification device 12, and the windbreak plate 15 is positioned so as to face the exhaust gas purification device 12. The windbreak plate 15 is formed with a combination of a steel plate and a heat insulating material, such as glass wool or rock fiber, and has heat insulation properties. In this embodiment, the windbreak plate 15 is erected on the bottom 6a of the front portion 6 of the ventilation path 5 and has an upper portion 15a curving toward the exhaust gas purification device 12 and an upper end surface positioned higher than an upper end surface of the exhaust gas purification device 12.

Figure 4A:
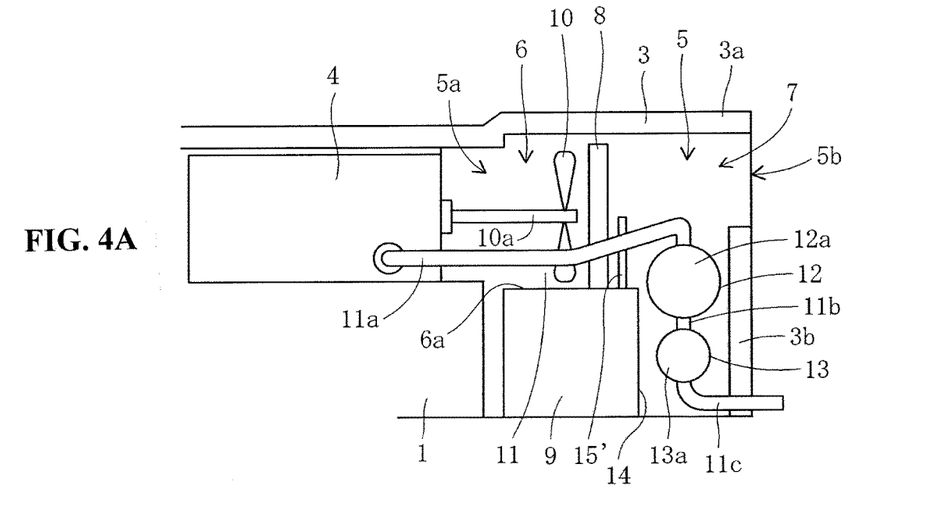
FIG. 4A and FIG. 4B provide cross-sectional views illustrating variants of a windbreak plate.
Figure 4B:
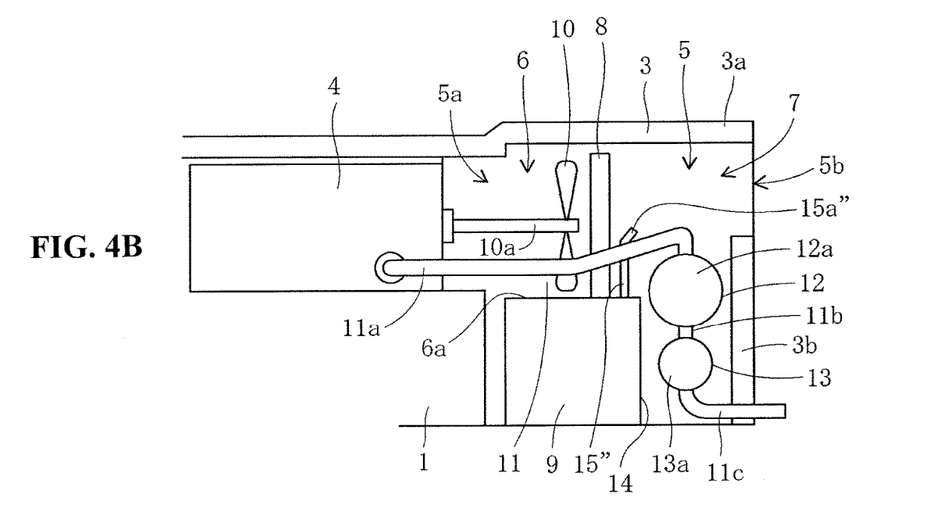

In this embodiment, although the upper portion 15a of the windbreak plate 15 curves toward the exhaust gas purification device 12, the shape of the windbreak plate 15 is not limited by this embodiment, and the windbreak plate 15 may have any shape so long as the shape renders it possible to prevent a cooing airflow from the radiator fan 10 from blowing onto the exhaust gas purification device 12. For example, a windbreak plate 15' may be configured so as to extend vertically upward from the bottom 6a of the front portion 6 of the ventilation path 5 past the upper end surface of the exhaust gas purification device 12, as shown in FIG. 4(A), or a windbreak plate 15" may be configured with an upper portion 15a" bending toward the exhaust gas purification device 12 and an upper end surface being positioned higher than an upper end surface of the exhaust gas purification device 12, as shown in FIG. 4(B).

The exhaust pipe 11 consists of a first portion 11a, a second portion 11b, and a third portion 11c, in which the first portion 11a extends from the engine 4 (i.e., an exhaust manifold (not shown) of the engine 4) through the front portion 6 of the ventilation path 5 in the counterweight portion 3 to a circumferential surface 12c (referred to below as an end circumferential surface) of the exhaust gas purification device 12, which is close to a left end surface 12a, the second portion 11b connects an end circumferential surface 12d of the exhaust gas purification device 12 on the side of a right end surface 12b to an end circumferential surface 13d of the muffler 13 on the side of a right end surface 13b, and the third portion 11c extends downward from an end circumferential surface 13c of the muffler 13 on the side of a left end surface 13a and shifts horizontally so as to protrude to the outside from the rear wall 3b of the counterweight portion 3.

As shown in FIG. 3(B), the second portion 11b of the exhaust pipe 11 includes a pipe 11d extending straight from the end circumferential surface 12d of the exhaust gas purification device 12 toward the muffler 13, and a pipe 11e extending straight from the end circumferential surface 13d of the muffler 13 toward the exhaust gas purification device 12, and the pipes 11d and 11e are connected to each other via flanges. In view of the two purposes to reduce the size of the entire engine exhaust system and reduce the loads on the connecting portions (i.e., the flanges) by allowing the exhaust gas purification device 12 and the muffler 13 to oscillate in the same mode, it is preferable that the pipes 11d and 11e are provided in as short lengths as possible.

In this embodiment, the tip of the exhaust pipe 11 protrudes horizontally from the rear wall 3b of the counterweight portion 3, but the position at which the tip (exhaust port) of the exhaust pipe 11 protrudes from the body 1 is not limited by the embodiment, and, for example, the tip (exhaust port) of the exhaust pipe 11 may protrude upward from the upper wall 3a of the counterweight portion 3.

Furthermore, in this embodiment, the first portion 11a of the exhaust pipe 11 is connected to the end circumferential surface 12c of the exhaust gas purification device 12, but the position at which to connect the first portion 11a is not limited by the embodiment and may be, for example, the left end surface 12a of the exhaust gas purification device 12. Similarly, the position at which to connect the third portion 11c of the exhaust pipe 11 to the muffler 13 is not limited to the end circumferential surface 13c and may be, for example, the left end surface 13a.

Since the pipes 11d and 11e, which extend straight respectively from the end circumferential surface 12d of the exhaust gas purification device 12 and the end circumferential surface 13d of the muffler 13 toward each other, are connected via the flanges, this embodiment renders it possible to make the coupling of the exhaust gas purification device 12 and the muffler 13 mechanically tight, and allow the exhaust gas purification device 12 and the muffler 13 to oscillate in the same mode, resulting in reduced loads on the connecting portions (i.e., the flanges).

Furthermore, in this embodiment, the ventilation path 5 of the counterweight portion 3 is formed such that the bottom of the rear portion 7 of the ventilation path 5 is lower than the bottom 6a of the front portion 6, whereby the exhaust gas purification device 12 and the muffler 13 can be compactly accommodated in the space of the rear portion 7 of the ventilation path 5; further, the windbreak plate 15 with heat insulation properties is provided between the radiator 8 and the exhaust gas purification device 12, whereby, when the forklift is being driven, neither is the exhaust gas purification device 12 subjected to cooling air directly from the radiator fan 10, nor is the radiator 8 subjected to radiation heat straight from the exhaust gas purification device 12, so that both unnecessary cooling of the exhaust gas purification device 12 and unnecessary heating of the radiator 8 can be minimized. Moreover, the exhaust system of the engine 4 can be accommodated in the counterweight portion 3 without reducing the efficiency of purifying exhaust gas by the exhaust gas purification device 12 and the efficiency of cooling by the radiator 8.

Furthermore, in this embodiment, the exhaust gas purification device 12 is disposed near the air outlet 5b of the ventilation path 5, and therefore, the exhaust gas purification device 12 can be accessed readily through the air outlet 5b, whereby easy maintenance of the exhaust gas purification device 12 can be facilitated. In addition, the rear space of the counterweight portion 3 is utilized as the space to accommodate the exhaust gas purification device 12 and the muffler 13, thereby almost eliminating the need to change existing structures of forklifts, so that the present invention can also be applied to existing forklifts at extremely low costs.

Figure 5A:
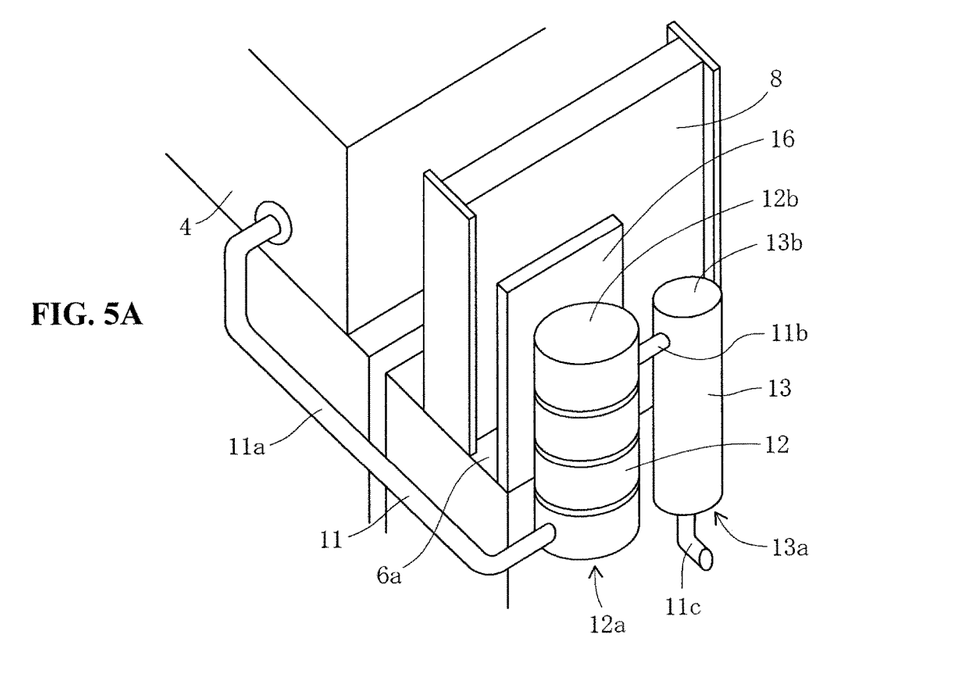
FIG. 5A and FIG. 5B provide views illustrating variants of the embodiment shown in FIG. 1.

FIG. 5(A) is an oblique view illustrating a variant of the embodiment shown in FIG. 1. This variant differs from the embodiment shown in FIG. 1 simply in the arrangement of the exhaust gas purification device and the muffler. Accordingly, in FIG. 5(A), the same components as those shown in FIG. 1 are denoted by the same numerals, and any detailed descriptions thereof will be omitted below. However, it should be noted that in FIG. 5(A), the numerals 12a and 13a respectively denote lower end surfaces of the exhaust gas purification device 12 and the muffler 13, and the numerals 12b and 13b respectively denote upper end surfaces of the exhaust gas purification device 12 and the muffler 13.

In this variant, both the exhaust gas purification device 12 and the muffler 13 are disposed in the rear portion 7 of the ventilation path 5 so as to extend vertically and be positioned side by side in the right-left direction of the body 1. In this case, both the exhaust gas purification device 12 and the muffler 13 protrude above the bottom 6a of the front portion 6 of the ventilation path 5.

Between the radiator 8 and the exhaust gas purification device 12, a windbreak plate 16 with heat insulation properties is erected on the bottom surface 6a of the front portion 6 of the ventilation path 5. The windbreak plate 16 extends vertically upward from the bottom surface 6a past the upper end surface 12b of the exhaust gas purification device 12. The windbreak plate 16 faces the exhaust gas purification device 12 but does not face the muffler 13.

This variant also renders it possible to achieve similar effects to those achieved by the embodiment shown in FIG. 1.

Figure 5B:
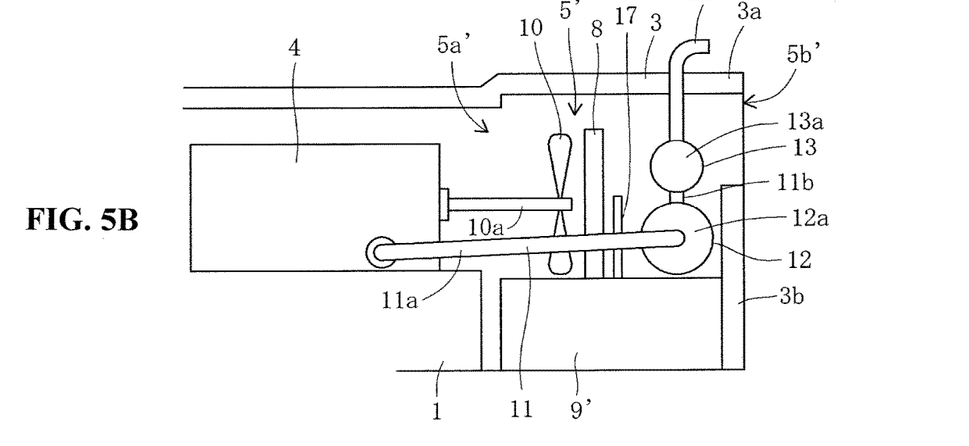

FIG. 5(B) is a cross-sectional view illustrating another variant of the embodiment shown in FIG. 1. This variant differs from the embodiment shown in FIG. 1 simply in the structure of the ventilation path in the counterweight portion, the arrangement of the exhaust gas purification device and the muffler, the disposition of the windbreak plate, and the position from which the exhaust pipe protrudes to the outside of the body. Accordingly, in FIG. 5(B), the same components as those shown in FIG. 1 are denoted by the same numerals, and any detailed descriptions thereof will be omitted below.

In this variant, the lower part of the counterweight portion 3 is occupied by a counterweight or body 9', and the space above the counterweight or body 9' in the counterweight portion 3 constitutes a ventilation path 5'. Accordingly, the ventilation path 5' has a constant height almost across its length. Moreover, both the exhaust gas purification device 12 and the muffler 13 are disposed rearward from the radiator 8 in the ventilation path 5' so as to extend in the right-left direction of the body 1 and be positioned one above the other with the exhaust gas purification device 12 lying below the muffler 13.

Between the radiator 8 and the exhaust gas purification device 12, a windbreak plate 17 with heat insulation properties is erected on the bottom of a ventilation path 5' so as to face the exhaust gas purification device 12. The windbreak plate 17 extends vertically upward from the bottom of the ventilation path 5' past the upper end surface of the exhaust gas purification device 12. The windbreak plate 17 may have its upper portion curved or bent toward the exhaust gas purification device 12. The third portion 11c is of the exhaust pipe 11 extends upward from the end circumferential surface of the muffler 13 on the right end surface side so as to cross the ventilation path 5' and protrude upward through the upper wall 3a of the counterweight portion 3.

This variant also renders it possible to achieve similar effects to those achieved by the embodiment shown in FIG. 1.

In the above embodiment, the industrial vehicle is a forklift, but the industrial vehicle to which the present invention can be applied is not limited to a forklift. The present invention can be applied to any industrial vehicle so long as the industrial vehicle includes a work device at the front of the body and a counterweight portion at the rear of the body to balance a load on the work device.

DESCRIPTION OF THE REFERENCE CHARACTERS 1 body
2 fork (work device)
3 counterweight portion
3a upper wall
3b rear wall
4 engine
5, 5' ventilation path
5a, 5a' air inlet
5b, 5b' air outlet
6 front portion
6a bottom
7 rear portion
8 radiator
9, 9' counterweight or body
10 radiator fan
10a rotating shaft
11 exhaust pipe
11a first portion
11b second portion
11c third portion
11d, 11e pipe
12 exhaust gas purification device
12a left end surface (lower end surface)
12b right end surface (upper end surface)
12c, 12d end circumferential surface
13 muffler
13a left end surface (lower end surface)
13b right end surface (upper end surface)
13c, 13d end circumferential surface
14 elevated part
15, 15', 15" windbreak plate
15a, 15a" upper portion
16 windbreak plate
17 windbreak plate

The invention claimed is:
1. An industrial vehicle comprising:
a work device attached at a front of a body;
a counterweight portion for balancing a load on the work device, the counterweight portion being disposed at a rear of the body and having a ventilation path provided therein so as to extend in a front rear direction of the body;

an engine attached to the body as a power source and disposed forward from the counterweight portion;

a radiator disposed rearward from the engine so as to be positioned immediately before a front end opening of the ventilation path or at a front portion of the ventilation path;

a radiator fan for cooling the radiator, the radiator fan being disposed between the engine and the radiator and allowing an airflow generated by rotation of the radiator fan to be exhausted to the outside of the body through the ventilation path;

an exhaust pipe supported by the body, connected to the engine at one end, and protruding from the rear of the body to the outside at the other end; and an exhaust gas purification device and a muffler provided at some positions along the exhaust pipe, wherein, both the exhaust gas purification device and the muffler have a tube-like outer shape and are disposed rearward from the radiator in the ventilation path, either one above the other or side by side in a right-left direction of the body, and pipes extend straight respectively from end circumferential surfaces of the exhaust gas purification device and the muffler toward each other and are connected via flanges.

2. The industrial vehicle according to claim 1, wherein, between the radiator and the exhaust gas purification device, a windbreak plate for preventing the airflow from blowing onto the exhaust gas purification device is disposed so as to face the exhaust gas purification device, and has heat insulation properties.

3. The industrial vehicle according to claim 2, wherein, an elevated part is formed between bottoms of the front and rear portions of the ventilation path, whereby the bottom of the rear portion is lower than the bottom of the front portion, the exhaust gas purification device and the muffler are disposed in the rear portion of the ventilation path so as to be positioned one above the other with the exhaust gas purification device lying above the muffler and at least partially protruding above the bottom of the front portion of the ventilation path, and the windbreak plate is erected on the bottom of the front portion such that the windbreak plate has an upper end surface positioned higher than an upper end surface of the exhaust gas purification device.

4. The industrial vehicle according to claim 2, wherein, the exhaust gas purification device and the muffler are disposed one above the other with the exhaust gas purification device lying below the muffler, and the windbreak plate is erected on the bottom of the ventilation path such that the windbreak plate has an upper end surface positioned higher than an upper end surface of the exhaust gas purification device.

5. The industrial vehicle according to claim 3, wherein at least an upper portion of the windbreak plate is bent or curved toward the exhaust gas purification device.

6. The industrial vehicle according to claim 3, wherein both the exhaust gas purification device and the muffler extend in the right-left direction of the body.

7. The industrial vehicle according to claim 2, wherein, an elevated part is formed between bottoms of the front and rear portions of the ventilation path, whereby the bottom of the rear portion is lower than the bottom of the front portion, the exhaust gas purification device and the muffler are disposed in the rear portion of the ventilation path so as to be positioned side by side in the right-left direction of the body, with the exhaust gas purification device at least partially protruding above the bottom of the front portion of the ventilation path, and the windbreak plate is erected on the bottom of the front portion such that the windbreak plate has an upper end surface positioned higher than an upper end surface of the exhaust gas purification device.

8. The industrial vehicle according to claim 7, wherein both the exhaust gas purification device and the muffler extend vertically.

9. The industrial vehicle according to claim 1 being a forklift.

* * * * *